(12) United States Patent
Jo

(10) Patent No.: US 7,577,982 B2
(45) Date of Patent: Aug. 18, 2009

(54) APPARATUS AND METHOD FOR ENCODING AND DECODING BROADCAST DATA IN A DIGITAL BROADCASTING SYSTEM

(75) Inventor: Chang-Lae Jo, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 737 days.

(21) Appl. No.: 11/389,031

(22) Filed: Mar. 27, 2006

(65) Prior Publication Data
US 2006/0268872 A1 Nov. 30, 2006

(30) Foreign Application Priority Data
May 4, 2005 (KR) .................. 10-2005-0037698

(51) Int. Cl.
H04N 7/16 (2006.01)
H04N 5/50 (2006.01)

(52) U.S. Cl. ............... 725/139; 725/138; 725/146; 725/151; 348/731

(58) Field of Classification Search ............ 725/131, 725/139, 151, 146, 144
See application file for complete search history.

(56) References Cited

U.S. PATENT DOCUMENTS 7,400,652 B2 * 7/2008 Kim et al. ............... 370/486
2005/0289623 A1 * 12/2005 Midani et al. ............ 725/100
2006/0075428 A1 * 4/2006 Farmer et al. ............ 725/38
2006/0140276 A1 * 6/2006 Boyce et al. .......... 375/240.21
2006/0242240 A1 * 10/2006 Parker et al. ............ 709/205
2007/0107024 A1 * 5/2007 Versteeg et al. ........... 725/95

FOREIGN PATENT DOCUMENTS

WO WO 2004114668 A1 * 12/2004

* cited by examiner

Primary Examiner—John W Miller
Assistant Examiner—Chris Parry
(74) Attorney, Agent, or Firm—Robert E. Bushnell, Esq.

(57) ABSTRACT

An apparatus and method for changing a channel in a digital broadcasting system are provided. The apparatus includes: a digital broadcast server for transmitting a multiplexed stream obtained by multiplexing at least one down broadcast data, and transmitting up broadcast data and at least one difference broadcast data; and a set-top box for accessing a channel over which the multiplexed stream is transmitted to perceive a down broadcasting PID (program identification) set for transmitting at least one down broadcast data contained in the multiplexed stream, upsizing and outputting down broadcast data having a down broadcasting PID corresponding to selected channel information from the multiplexed stream when a user selects a certain channel, summing difference broadcast data corresponding to a difference broadcasting PID and broadcast data obtained by upsizing the down broadcast data corresponding to the channel information, and outputting the result. As a result, a channel change delay which occurs when changing a channel is reduced.

6 Claims, 3 Drawing Sheets

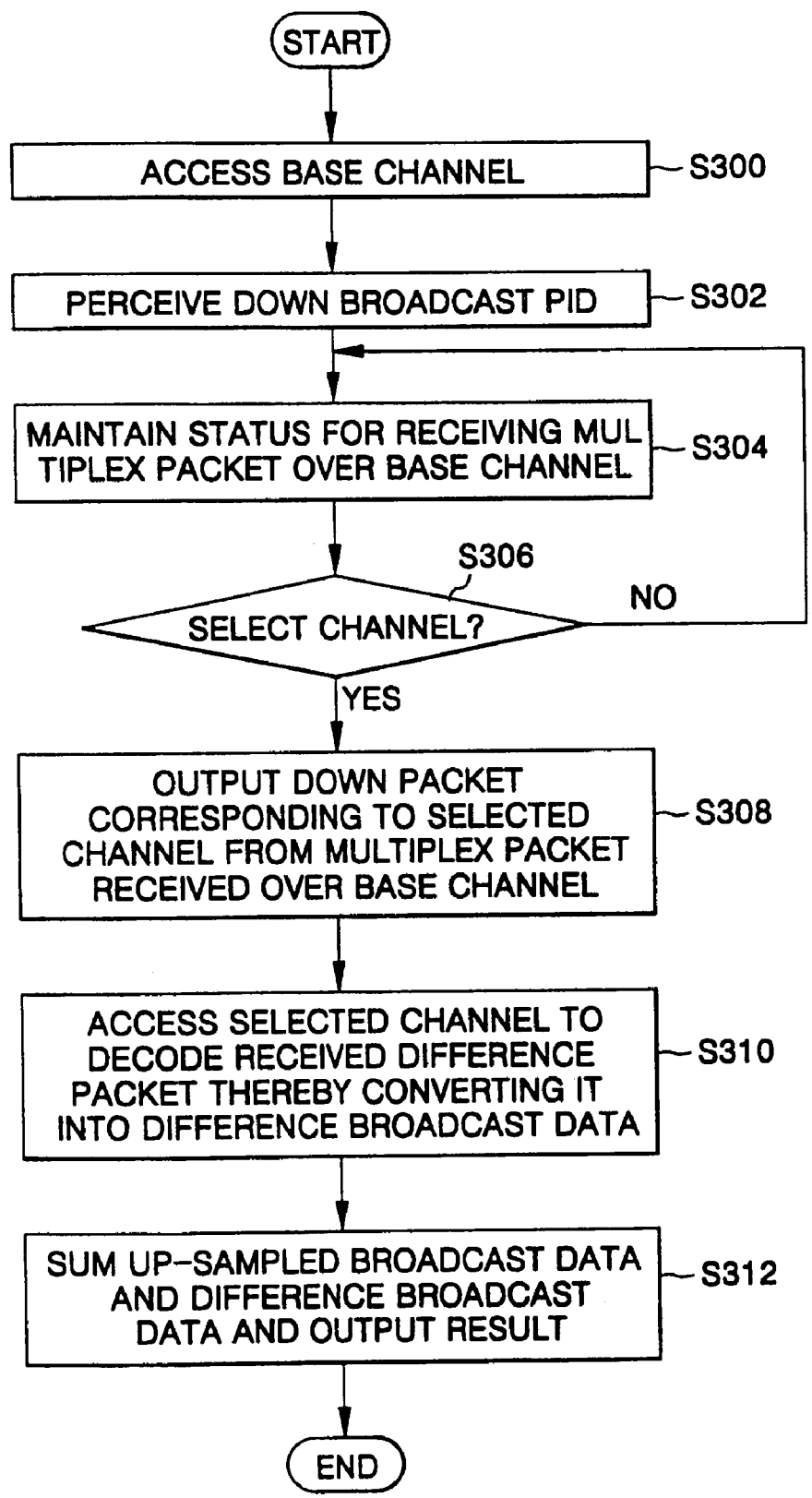

APPARATUS AND METHOD FOR ENCODING AND DECODING BROADCAST DATA IN A DIGITAL BROADCASTING SYSTEM

CLAIM OF PRIORITY

This application makes reference to, incorporates the same herein, and claims all benefits accruing under 35 U.S.C. §119 from an application for APPARATUS AND METHOD FOR CHANGING CHANNEL IN DIGITAL BROADCASTING SYSTEM earlier filled in the Korean Intellectual Property Office on 4 May 2005 and there duly assigned Serial No. 10-2005-0037698.

BACKGROUND OF THE INVENTION

1. Field of the Invention

The present invention relates to an apparatus and method for changing a channel in a digital broadcasting system, and more particularly, to an apparatus and method for changing a channel in a digital broadcasting system that can reduce a channel change delay which occurs when there is a channel change request from a user of a digital broadcasting service provided through an IP (Internet protocol) network.

2. Description of the Related Art

In digital broadcasting, program information of respective channels based on a coding standard such as moving picture experts group (MPEG) is compressed with high efficiency, and programs corresponding to a plurality of channels are multiplexed with high efficiency based on a digital modulation method of a transmission media and then transmitted. Thus, digital broadcasting, unlike analog broadcasting, can be performed over tens to hundreds of channels without using numerous repeaters.

Digital broadcasting is classified according to transmission medium into digital terrestrial broadcasting, digital satellite broadcasting, and cable digital broadcasting. Digital satellite broadcasting is currently spreading all over the world, and digital terrestrial broadcasting is being tested in some places such as the USA and Europe.

Digital broadcasting has been mainly provided via cable. However, with the development of high-speed Internet technology, it is starting to be provided via an IP network.

A digital broadcasting system for providing such a digital broadcasting service includes a digital broadcast server for providing broadcast data through an IP network, and at least one set-top box connected to the IP network to receive the broadcast data provided from the digital broadcast server and present it to a user.

The digital broadcast server encodes analog broadcast data received from a digital broadcasting station (i.e., system operator), converts it into digital broadcast data, compresses it to generate packets, and multi-casts the packets to the IP network. Here, the packets sent to the IP network can be formed according to a moving picture experts group 2 (MPEG-2) transport stream (TS) standard.

That is, the digital broadcast server transmits the broadcast data of a certain channel to the IP network through a multi-casting transmission.

The set-top box decompresses and decodes the packets received from the IP network and then provides the digital broadcast data to a digital television.

Here, a multi-cast packet transmitted from the digital broadcast server to the IP network contains only broadcast data of a single channel. That is, the multi-cast packet transmitted from the digital broadcast server to the IP network contains only one single program transport stream (SPTS) MPEG-2 TS.

If there is a channel change request from a user, the set-top box accesses the requested channel and provides the digital television with the digital broadcast data obtained by decoding the packets received over the corresponding channel. That is, the set-top box interprets a program association table (PAT) contained in the packet received over the changed channel to obtain program map table (PMT) information, and perceives a video program identification (PID) contained in the obtained PMT information. Then, the set-top box finds packets corresponding to the video PID perceived through the packet received over the changed channel from the MPEG-2 TS and decodes them.

However, it takes time for the set-top box to interpret the PAT to obtain the PMT information and perceive the PID information from the obtained PMT information. Thus there is an inconvenient channel change delay.

SUMMARY OF THE INVENTION

It is an objective of the present invention to provide an apparatus and method for changing a channel in a digital broadcasting system that can reduce a channel change delay which occurs when there is a channel change request from a user of a digital broadcasting service provided through an IP network.

According to an aspect of the present invention, there is provided an apparatus for changing a channel in a digital broadcasting system, including: a digital broadcast server for transmitting a multiplexed stream obtained by multiplexing at least one down broadcast data obtained by downsizing at least one broadcast data to a network over a set channel, and transmitting up broadcast data obtained by upsizing the down broadcast data and at least one difference broadcast data obtained by differentiating the broadcast data to the network over respective set channels; and a set-top box for accessing a channel over which the multiplexed stream is transmitted to perceive a down broadcasting PID set for transmitting at least one down broadcast data contained in the multiplexed stream, upsizing and outputting down broadcast data having a down broadcasting PID corresponding to selected channel information from the multiplexed stream when a user selects a certain channel, summing difference broadcast data corresponding to a difference broadcasting PID obtained from streams received over the selected channel using the down broadcasting PID corresponding to the channel information and broadcast data obtained by upsizing the down broadcast data corresponding to the down broadcasting PID corresponding to the channel information, and outputting the result.

The channel information may include at least one of IP address information and port information set for transmitting the difference broadcast data to the network.

The difference broadcasting PID may be obtained by subtracting a set value from a value of the down broadcasting PID corresponding to the channel information.

According to another aspect of the present invention, there is provided a method for changing a channel in a digital broadcasting system, including: transmitting a multiplexed stream obtained by multiplexing at least one down broadcast data obtained by downsizing at least one broadcast data to a network over a set channel, and transmitting up broadcast data obtained by upsizing the down broadcast data and at least one difference broadcast data obtained by differentiating the broadcast to the network over respective set channels; accessing a channel over which the multiplexed stream is transmitted to perceive a down broadcasting PID set for transmitting at least one down broadcast data contained in the multiplexed stream, upsizing and outputting down broadcast data having a down broadcasting PID corresponding to selected channel information from the multiplexed stream when a user selects a certain channel; and summing difference broadcast data corresponding to a difference broadcasting PID obtained from streams received over the selected channel using the down broadcasting PID corresponding to the channel information and broadcast data obtained by upsizing the down broadcast data corresponding to the down broadcasting PID corresponding to the channel information, and outputting the result.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 3 is a flowchart illustrating a method for changing a channel of the set-top box in the digital broadcasting system according to the present invention.

DETAILED DESCRIPTION OF EXEMPLARY EMBODIMENTS

An apparatus and method for changing a channel in a digital broadcasting system according to the present invention will now be described more fully hereinafter with reference to the accompanying drawings. Like numbers refer to like elements throughout the specification.

Figure 1:
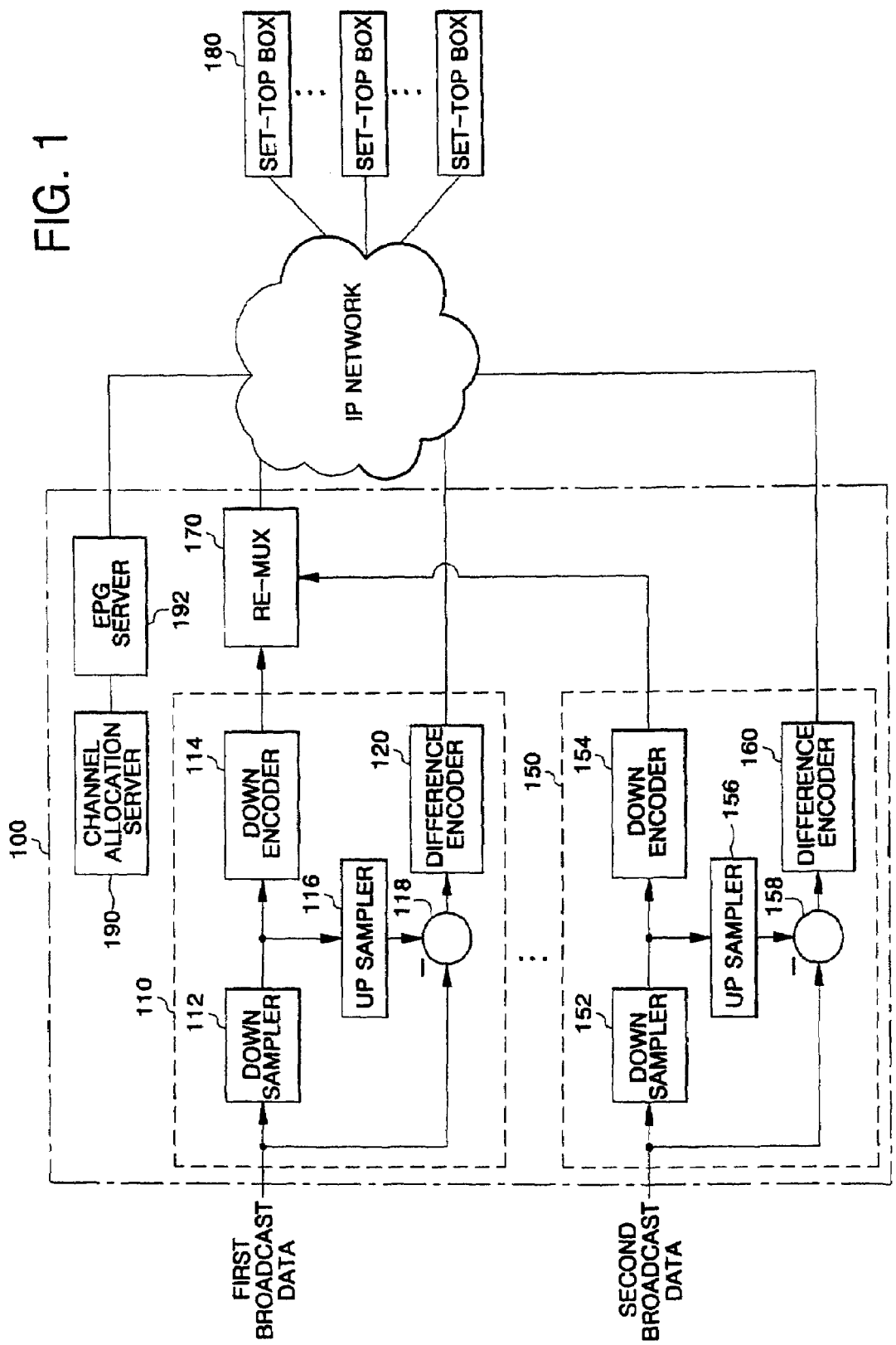
FIG. 1 is a block diagram of a digital broadcasting system according to the present invention.

FIG. 1 is a block diagram of a digital broadcasting system according to the present invention.

The digital broadcasting system of FIG. 1 includes a digital broadcast server 100 and at least one set-top box 180 connected to the digital broadcast server 100 through the IP network.

The digital broadcast server 100 includes at least one encoding processor, e.g., 110 and 150, and a RE-MUX 170.

The encoding processor 110 includes a down sampler 112, a down encoder 114, an up sampler 116, a difference portion 118, and a difference encoder 120.

The down sampler 112 reduces the size of first broadcast data received from a first digital broadcasting station (not shown) to a prescribed size and outputs it as first down broadcast data. Here, the first broadcast data is preferably digital data.

The down decoder 114 encodes the first down broadcast data to generate a first down packet and provides the first down packet to the RE-MUX 170. Preferably, the first down packet contains a broadcasting PID for discriminating it from the first down broadcast data.

The up sampler 116 up-samples the first down broadcast data output from the down sampler 112 to correspond to the size of the first broadcast data and outputs it as first up broadcast data.

The difference portion 118 differentiates the first broadcast data and the first up broadcast data and outputs the result as first difference broadcast data.

The difference encoder 120 encodes the first difference broadcast data output from the difference portion 118 to generate a first difference packet and transmits the first difference packet to the IP network. Preferably, the first difference packet contains a broadcasting PID for discriminating it from the first difference broadcast data. Preferably, this broadcasting PID value for discriminating from the first difference broadcast data is identical to the broadcasting PID value for discriminating from the first down broadcast data.

Similarly, the encoding processor 150 receives second broadcast data from a second digital broadcasting station (not shown) to generate a second down packet and a second difference packet, and transmits the second down packet to the RE-MUX portion 170 and the second difference packet to the IP network. Preferably, the second broadcast data is digital data. The procedure by which the encoding processor 150 generates the second difference packet and the second down packet in response to input of the second broadcast data is the same as the procedure by which the encoding processor 110 generates the first down packet and the first difference packet in response to input of the first broadcast data.

A channel allocation server 190 allocates a channel for transmitting a multiplex packet output from the RE-MUX 170 and the first and second difference packets output from the difference encoders 120 and 160 to the IP network.

That is, the channel allocation server 190 allocates channel information containing an IP address and a port for transmitting the multiplex packet and the first and second difference packets to the IP packet and provides the channel information to an electronic program guide (EPG) server 192. That is, the multiplex packet and the first and second difference packets contain channel information respectively allocated thereto. Here, a channel allocated to transmit the multiplex packet is referred to as a base channel.

The EPG server 192 inserts the channel allocation information provided from the channel allocation server 190 into EPG information which is a broadcasting program displayed on a screen of a digital television, and transmits it to the IP network.

The RE-MUX 170 adds the broadcasting PID values which are contained in the first and second down packets provided from the encoding processors 110 and 150 to generate a down broadcasting PID value, inserts the down broadcasting PID value into the multiplex packet obtained by multiplexing the first and second down packets, and transmits it to the IP network.

The set-top box 180 receives the EPG information from the IP network and provides it to a user through the digital television connected to the set-top box 180, and accesses a channel selected by a user to provide the broadcast data received over the selected channel to the user through the digital television.

Figure 2:
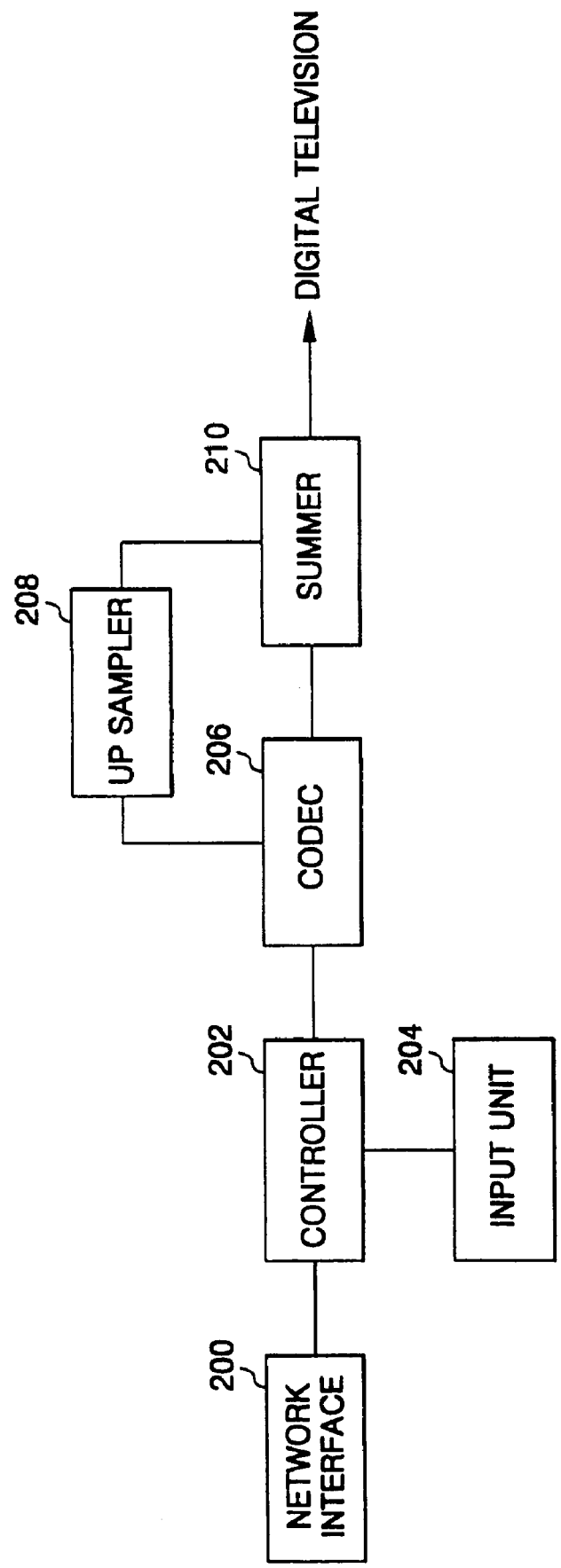
FIG. 2 is a detailed block diagram of a set-top box according to the present invention.

FIG. 2 is a detailed block diagram of the set-top box according to the present invention.

The set-top box of FIG. 2 includes a network interface 200, a controller 202, an input unit 204, a codec 206, an up sampler 208, and a summer 210.

The controller 202 checks an IP address and a port number for joining a base channel through the EPG information received from the IP network when power is applied to the set-top box, and accesses the base channel through the network interface 200 using the checked IP address and the port number.

The controller 202 receives the multiplex packet over the base channel accessed by the network interface 200 and interprets the PAT/PMT (program association table/program map table) information contained in the multiplex packet received over the accessed base channel to perceive and store the down broadcasting PIDs allocated for the down broadcast data.

The controller 202 obtains the selected channel information from the EPG when a user selects and requests a certain channel through the input unit 204. The selected channel information contains the IP address or/and the port number set for transmitting the difference packet.

The controller 202 extracts the down packet having the down broadcasting PID corresponding to the selected channel information from the multiplex packet received over the base channel and provides it to the codec 206.

The codec 206 can be implemented using a software layer method and decodes the down packet provided from the controller 202 and outputs it as the down broadcast data.

The up sampler 208 up-samples the down broadcast data output from the codec 206 thereby converting it into the broadcast data of a prescribed size, and outputs it to the digital television through the summer 210.

The controller 202 provides the down packet having the down broadcasting PID corresponding to the selected channel information and then accesses the corresponding channel through the network interface using the selected channel information.

The controller 202 receives the difference packet (e.g., first and second packets) over the selected channel and checks for a difference packet containing a difference broadcasting PID obtained by subtracting a set value in the down broadcasting PID value contained in the multiplex packet received over the base channel.

The controller 202 provides the perceived (checked) difference packet to the codec 206.

The codec 206 decodes the difference packet provided from the controller 202 thereby converting it into the difference broadcast data, and provides the difference broadcast data to the summer 210.

At the same time of receiving the difference packet over the selected channel, the controller 202 provides the codec 206 with the down packet corresponding to the selected channel from the multiplex packet received over the base channel. The codec 206 converts the down packet corresponding to the selected channel into the down broadcast data and provides it to the up sampler 208. The up sampler 208 up-samples the down broadcast data thereby converting it into the broadcast data of a prescribed size, and provides it to the summer 210.

The summer 210 sums the difference broadcast data provided from the codec 206 and the broadcast data provided from the up sampler 208 and provides the result to the digital television.

FIG. 3 is a flowchart illustrating a method for changing a channel of the set-top box in the digital broadcasting system according to the present invention.

As shown in FIG. 3, the controller 202 checks an IP address and a port number for joining a base channel through the EPG information received from the IP network when power is applied to the set-top box, and accesses the base channel through the network interface 200 using the checked IP address and the port number (step S300).

The controller 202 interprets the PAT/PMT information contained in the multiplex packet received over the accessed base channel to perceive and store the down broadcasting PIDs allocated for the down broadcast data (step S302).

Then, the controller 202 receives the multiplex packet over the base channel accessed by the network interface 200 (step S304).

The controller checks whether or not a user selects and requests a certain channel through the input unit 204 (step S306). When the user selects and request a certain channel through the input unit 204, the controller 202 obtains the selected channel information from the EPG, extracts the down packet having the down broadcasting PID corresponding to the selected channel information from the multiplex packet received over the base channel, and provides it to the codec 206. The codec 206 decodes the down packet provided from the controller 202 and outputs it as the down broadcast data. The up sampler 208 up-samples the down broadcast data output from the codec 206 thereby converting it into the broadcast data of a predetermined size, and outputs it to the digital television through the summer 210 (step S308).

After providing the down packet having the down broadcasting PID corresponding to the selected channel information to the codec, the controller 202 accesses the corresponding channel through the network interface using the selected channel information to receive the difference packet.

The controller 202 perceives or checks the packets received over the selected channel for a difference packet containing a difference broadcasting PID obtained by subtracting a value set in the down broadcasting PID value, and provides the perceived or checked difference packet to the codec 206. The codec 206 decodes the difference packet provided from the controller 202 thereby converting it into the difference broadcast data, and provides the difference broadcast data to the summer 210 (step S310).

At the same time the difference packet is received over the selected channel, the controller 202 provides the codec 206 with the down packet having the down broadcasting PID corresponding to the selected channel from the multiplex packet received over the base channel. The codec 206 converts the down packet having the down broadcasting PID corresponding to the selected channel into the down broadcast data and provides it to the up sampler 208. The up sampler 208 up-samples the down broadcast data thereby converting it into the broadcast data of a prescribed size, and provides it to the summer 210.

The summer 210 sums the difference broadcast data provided from the codec 206 and the broadcast data provided from the up sampler 208 and provides the result to the digital television (step S312).

As described above, the apparatus and method for changing a channel in a digital broadcasting system according to the present invention can perceive the channel information for transmitting the broadcast data to the IP network over the set channel and thus can reduce the channel change delay which occurs when the is changed.

While the present invention has been described with reference to exemplary embodiments thereof, it will be understood by those skilled in the art that various changes in form and detail may be made therein without departing from the scope of the present invention as defined by the following claims.

What is claimed is:

1. An apparatus for changing a channel in a digital broadcasting system, comprising:
   a digital broadcast server for transmitting a multiplexed stream, obtained by multiplexing at least one down broadcast data obtained by downsizing at least one broadcast data to an IP (Internet protocol) network over a set channel, and transmitting up broadcast data obtained by upsizing the down broadcast data and at least one difference broadcast data obtained by differentiating the broadcast data, to the IP network over respective set channels; and
   a set-top box for accessing a channel over which the multiplexed stream is transmitted to perceive a down broadcasting PID set for transmitting at least one down broadcast data contained in the multiplexed stream, upsizing and outputting down broadcast data having a down broadcasting PID corresponding to selected channel information from the multiplexed stream when a user selects a certain channel, summing difference broadcast data corresponding to a difference broadcasting PID obtained from streams received over the selected channel using the down broadcasting PID corresponding to the channel information and broadcast data obtained by upsizing the down broadcast data corresponding to the down broadcasting PID corresponding to the channel information, and outputting the result for display on a digital television.

2. The apparatus of claim 1, wherein the channel information contains at least one of IP address information and port information set for transmitting the difference broadcast data to the IP network.

3. The apparatus of claim 1, wherein the difference broadcasting PID is obtained by subtracting a set value from a value of the down broadcasting PID corresponding to the channel information.

4. A method for changing a channel in a digital broadcasting system, comprising:

transmitting a multiplexed stream obtained by multiplexing at least one down broadcast data obtained by downsizing at least one broadcast data to a network over a set channel, and transmitting up broadcast data obtained by upsizing the down broadcast data and at least one difference broadcast data obtained by differentiating the broadcast data to the network over respective set channels;

accessing a channel over which the multiplexed stream is transmitted to perceive a down broadcasting PID set for transmitting at least one down broadcast data contained in the multiplexed stream, upsizing and outputting down broadcast data having a down broadcasting PH) corresponding to selected channel information from the multiplexed stream when a user selects a certain channel; and summing difference broadcast data corresponding to a difference broadcasting PID obtained from streams received over the selected channel using the down broadcasting PID corresponding to the channel information and broadcast data obtained by upsizing the down broadcast data corresponding to the down broadcasting PID corresponding to the channel information, and outputting the result.

5. The method of claim 4, wherein the channel information contains at least one of IP address information and port information set for transmitting the difference broadcast data to the network.

6. The method of claim 4, wherein the difference broadcasting PID is obtained by subtracting a set value from a value of the down broadcasting PID corresponding to the channel information.

\* \* \* \* \*

UNITED STATES PATENT AND TRADEMARK OFFICE
CERTIFICATE OF CORRECTION

PATENT NO. : 7,577,982 B2  Page 1 of 1
APPLICATION NO. : 11/389031
DATED : August 18, 2009
INVENTOR(S) : Chang-Lae Jo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 814 days.

Signed and Sealed this

Seventh Day of September, 2010

David J. Kappos
*Director of the United States Patent and Trademark Office*